(12) United States Patent
Chen et al.

(10) Patent No.: US 8,402,545 B1
(45) Date of Patent: Mar. 19, 2013

(54) SYSTEMS AND METHODS FOR IDENTIFYING UNIQUE MALWARE VARIANTS

(75) Inventors: Joseph Chen, Los Angeles, CA (US); Christopher Peterson, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 192 days.

(21) Appl. No.: 12/902,479

(22) Filed: Oct. 12, 2010

(51) Int. Cl.
*G06F 21/00* (2006.01)
(52) U.S. Cl. .................................................. 726/24
(58) Field of Classification Search ............... 726/22–25
See application file for complete search history.

(56) References Cited

U.S. PATENT DOCUMENTS

| | | | |
|---|---|---|---|
| 7,269,851 | B2 | 9/2007 | Ackroyd |
| 7,831,412 | B1 | 11/2010 | Sobel |
| 2005/0283831 | A1 | 12/2005 | Ryu et al. |
| 2006/0253584 | A1 | 11/2006 | Dixon et al. |
| 2007/0016953 | A1* | 1/2007 | Morris et al. ............. 726/24 |
| 2007/0094734 | A1* | 4/2007 | Mangione-Smith et al. ... 726/24 |

OTHER PUBLICATIONS

Satish, Sourabh; U.S. Appl. No. 12/049,751, filed Mar. 17, 2008.
Satish, Sourabh; U.S. Appl. No. 12/056,379, filed Mar. 27, 2008.
Nachenberg, Carey S.; U.S. Appl. No. 12/415,834, filed Mar. 31, 2009.
Sourabh Satish et al.; Social Trust Based Security Model; Mar. 31, 2006; U.S. Appl. No. 11/394,846.

* cited by examiner

*Primary Examiner* — Brandon Hoffman
*Assistant Examiner* — Anthony Brown
(74) *Attorney, Agent, or Firm* — Advantedge Law Group

(57) ABSTRACT

A computer-implemented, server-side method for identifying unique malware variants may include (1) identifying the creation of a child object by a parent object on a client device, (2) determining that instances of both the parent object and the child object occur relatively infrequently within a user community, (3) classifying, based at least in part on the low prevalence of the parent and child objects within the user community, the child object as a potential security risk, and then (4) providing the child object's classification to at least one computing device in order to enable the computing device to evaluate the trustworthiness of the child object. Corresponding systems, encoded computer-readable media, and client-side methods are also disclosed.

20 Claims, 8 Drawing Sheets

Reputation Information
512

File Name: bar.exe
File Hash: 0xAD93C931
Reputation Score: N/A
Prevalence: 3

Reputation Information
514

File Name: foo.exe
File Hash: 0xEF9A0349
Reputation Score: N/A
Prevalence: N/A

*FIG. 5*

SYSTEMS AND METHODS FOR IDENTIFYING UNIQUE MALWARE VARIANTS

BACKGROUND

In recent years, authors of malicious software ("malware") have attempted to proliferate malware by generating thousands or potentially millions of variations of a malicious program or file. For example, a malware author may create a unique variant of a malicious file for each intended target by repacking, compressing, encrypting, and/or otherwise obfuscating the file before distributing (or redistributing) the same. Unfortunately, because many existing antivirus technologies detect malware by detecting or identifying unique digital signatures or fingerprints associated with known-malicious files, malware authors may avoid detection by only distributing new (i.e., unique) variants of their malicious files.

In an attempt to combat this problem, at least one security-software vendor has attempted to implement a reputation-based security system. In a reputation-based security system, a security-software vendor may attempt to determine the trustworthiness of a file by collecting, aggregating, and analyzing data from potentially millions of user devices within a community, such as the security-software vendor's user base. For example, by determining a file's origin, age, and prevalence within the community (such as whether the file is predominantly found on at-risk or "unhealthy" machines within the vendor's user base), among other details, a security-software vendor may gain a fairly accurate understanding as to the trustworthiness of the file.

However, in order to avoid producing an unacceptable number of false positives, reputation-based security systems may allow new files (i.e., files that have not been encountered before within the community) to be stored and run on user devices. Thus, by only distributing unique or otherwise obfuscated variants of malicious files, malware authors may circumvent some reputation-based security systems. As such, the instant disclosure identifies a need for systems and methods for effectively detecting unique malware variants.

SUMMARY

As will be described in greater detail below, the instant disclosure generally relates to systems and methods for identifying and convicting unique (or nearly unique) malware variants. In one example, a server or backend may accomplish such a goal by (1) identifying the creation of a child object (such as an executable file) by a parent object on a client device, (2) determining that instances of both the parent object and the child object occur relatively infrequently (or have never been encountered) within a user community (such as an enterprise or the user base of a security-software vendor), (3) classifying, based at least in part on the low prevalence of both the parent object and the child object within the user community, the child object as a potential security risk, and then (4) providing the child object's classification to at least one computing device (such as the client device in question or an additional client device) in order to enable the computing device to evaluate the trustworthiness of the child object.

In one embodiment, the server or backend may receive a report from the client device that uniquely identifies both the child object and the parent object responsible for creating the same. In this embodiment, the server or backend may, by collecting, aggregating, and analyzing similar reports from hundreds of thousands or potentially millions of clients devices within the user community, determine the prevalence of the child object and/or its parent object within the user community.

In some examples, the server or backend may only convict a child object (i.e., classify the child object as a security risk) if an instance of the child object and/or its parent object has never been encountered before within the user community (i.e., if the child object and/or the parent object represents a new or unique file or singleton). In other examples, the server or backend may convict a child object if less than a predetermined number of instances of the child object and/or its parent object appear within the user community or if instances of the child object and/or its parent object appear on less than a predetermined percentage of user devices within the user community. These predetermined percentages and numbers may be determined based on a variety of predictive rules and heuristics.

In another example, a client device may evaluate the trustworthiness of a file based at least in part on a trustworthiness classification assigned to the file by the server-side process outlined above. In this example, the client device may accomplish such a goal by (1) identifying a file (by, e.g., observing or detecting creation of the file), (2) querying a server or backend for a trustworthiness classification assigned to the file, (3) receiving a trustworthiness classification assigned to the file by the server or backend that indicates that the file represents a potential security risk, and then (4) performing a security operation on the file (by, e.g., quarantining or removing the file and/or otherwise preventing the file from executing). As detailed above, the trustworthiness classification assigned to the file by the server or backend may be based at least in part on the fact that instances of both the file and a parent file responsible for creating the file occur relatively infrequently (or have never been encountered) within a user community managed by the server or backend.

As will be explained in greater detail below, because legitimate singleton files do not typically originate from other singletons (i.e., legitimate singleton files do not typically spawn additional legitimate singletons), the various systems and methods described herein may effectively identify unique instances of packed or otherwise obfuscated malware by determining that instances of a parent file responsible for creating a singleton (or low prevalence) file have been encountered infrequently (or have never been encountered) within an enterprise or user base. As such, these systems and methods may effectively address an existing flaw in conventional security software without unduly increasing false-positive rates.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of exemplary reputation information that may indicate the prevalence of a child and parent object within a user community.

Figure 1:
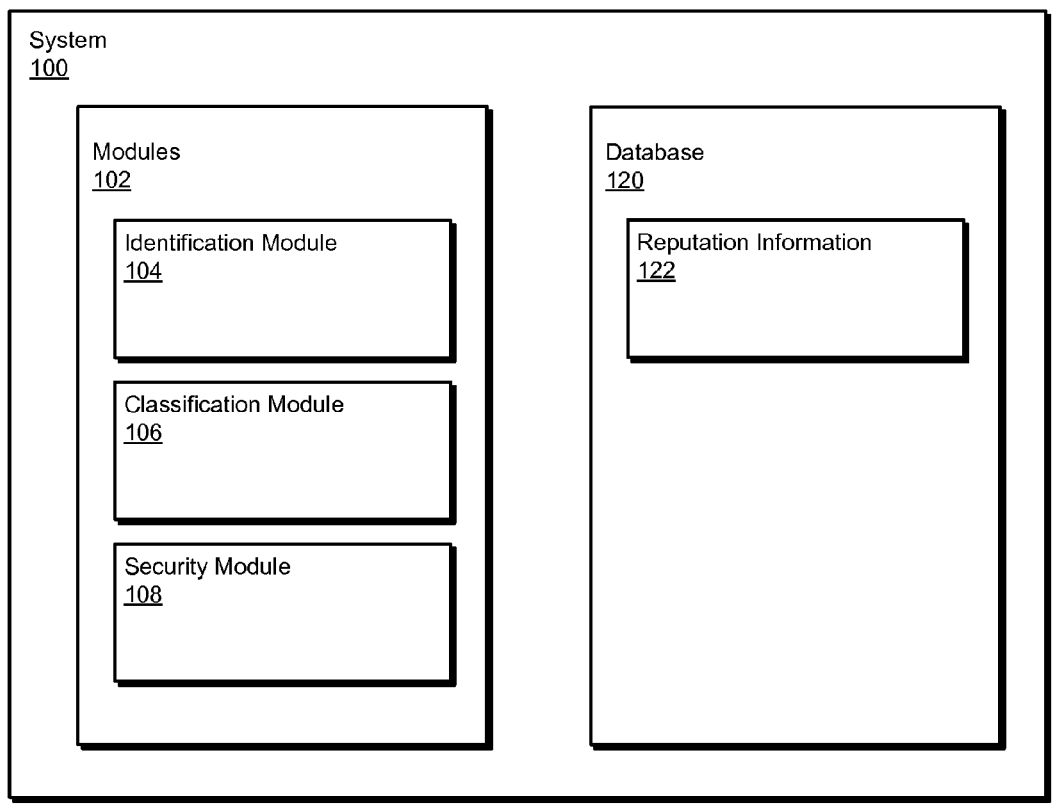
FIG. 1 is a block diagram of an exemplary system for identifying unique malware variants.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
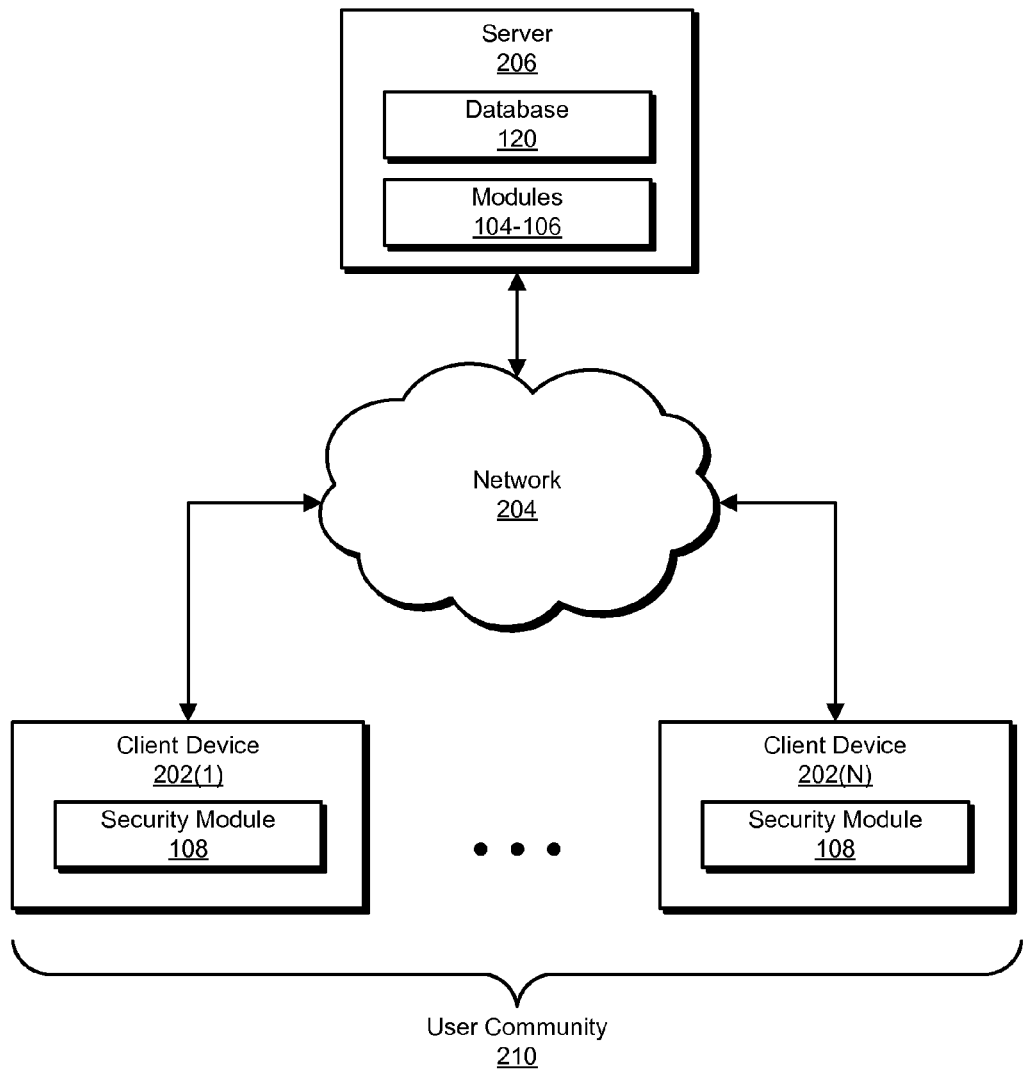
FIG. 2 is a block diagram of an exemplary system for identifying unique malware variants.

The following will provide, with reference to FIGS. 1-2, detailed descriptions of exemplary systems for identifying unique malware variants. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for identifying unique malware variants. As illustrated in this figure, exemplary system 100 may include one or more modules 102 for performing one or more tasks. For example, and as will be explained in greater detail below, exemplary system 100 may include an identification module 104 programmed to identify a child object (such as a file) created by a parent object on a client device. Exemplary system 100 may also include a classification module 106 programmed to classify the child object as a potential security risk if instances of both the child object and the parent file responsible for creating the child object occur relatively infrequently within a user community (which may, as described in greater detail below, consist of hundreds of thousands or potentially millions of users within an enterprise or user base).

In addition, and as will be described in greater detail below, exemplary system 100 may include a security module 108 programmed to perform security operations on child objects that are determined to represent potential security risks. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., client devices 202(1)-(N) and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, the various systems described herein may store reputation information 122 within database 120. As will be explained in greater detail below, reputation information 122 may represent information that identifies the reputation or prevalence of one or more files within a community (such as an enterprise or the user base of a security-software vendor).

Database 120 may represent portions of a single database or computing device or a plurality of databases or computing devices. For example, database 120 may represent a portion of server 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as server 206 and/or client devices 202(1)-(N) in FIG. 2, computing system 710 in FIG. 7, and/or portions of exemplary network architecture 800 in FIG. 8.

Exemplary system 100 in FIG. 1 may be deployed in a variety of ways. For example, all or a portion of exemplary system 100 may represent portions of exemplary system 200 in FIG. 2. As shown in FIG. 2, system 200 may include a plurality of client devices 202(1)-(N) in communication with a server 206 via a network 204.

In one embodiment, and as will be described in greater detail below, identification module 104 and classification module 106 may program server 206 to identify unique malware variants by (1) identifying the creation of a child object (such as a file) by a parent object on a client device (by, e.g., receiving a report from client device 202(1) that identifies the creation of a child object by a parent object on client device 202(1)), (2) determining that instances of both the parent object and the child object occur relatively infrequently within a user community (e.g., user community 210), (3) classifying, based at least in part on the low prevalence of the parent and child objects within the user community, the child object as a potential security risk, and then (4) providing the child object's classification to at least one computing device (e.g., one or more of client devices 202(1)-(N)) in order to enable the computing device to evaluate the trustworthiness of the child object.

Similarly, security module 108 may program one or more of client devices 202(1)-(N) to identify unique malware variants by (1) identifying a file (by, e.g., observing or detecting creation of the file), (2) querying a server (e.g., server 206) for a trustworthiness classification assigned to the file, (3) receiving, from the server, a trustworthiness classification assigned to the file that indicates that the file represents a potential security risk, and then (4) performing a security operation on the file. As will be explained in greater detail below, the trustworthiness classification assigned to the file by the server may be based at least in part on the fact that instances of both the file and a parent file responsible for creating the file occur relatively infrequently within a user community managed by the server.

Figure 7:
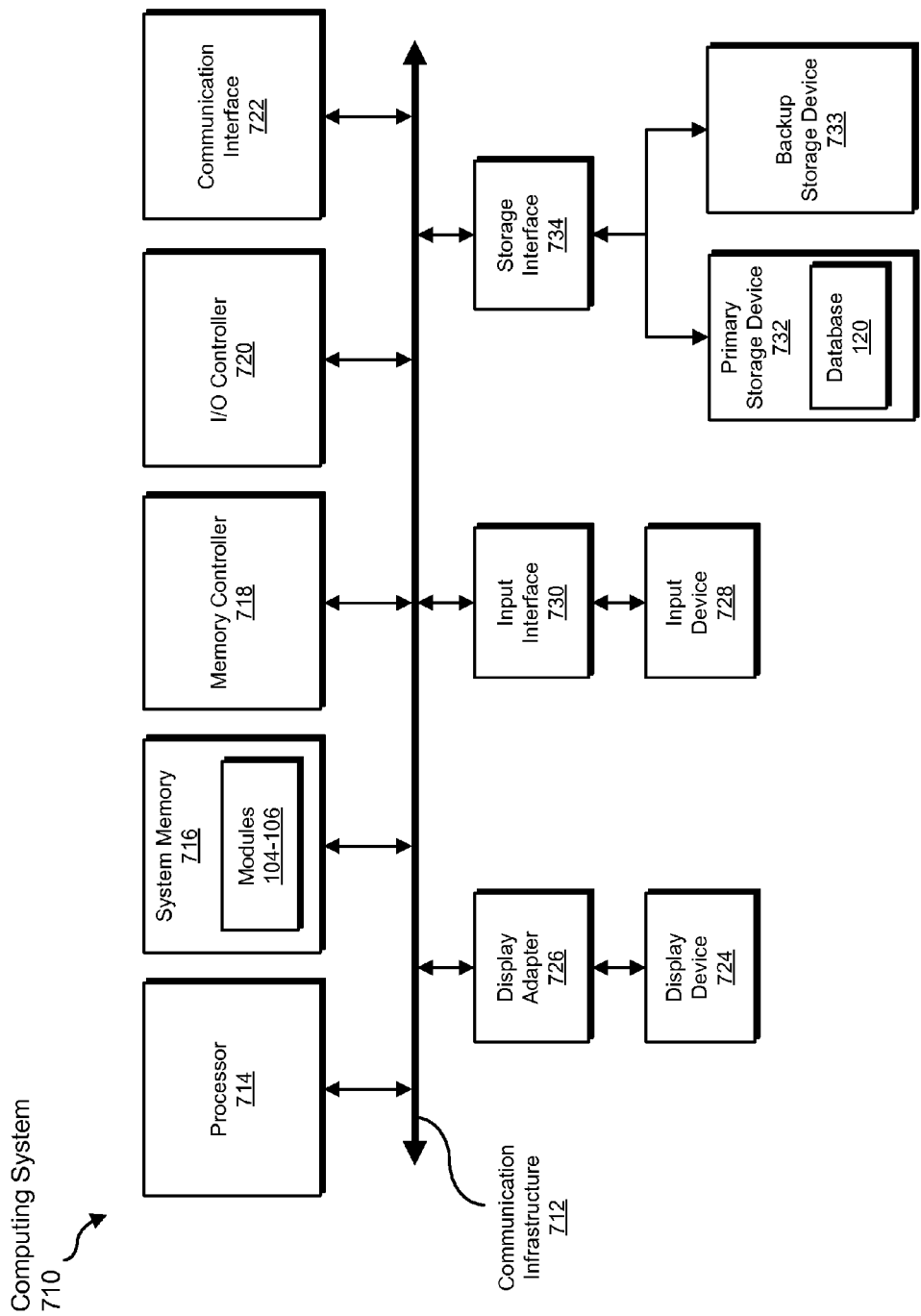
FIG. 7 is a block diagram of an exemplary computing system capable of implementing one or more of the embodiments described and/or illustrated herein.

Client devices 202(1)-(N) generally represent any type or form of computing device capable of reading computer-executable instructions. Examples of client devices 202(1)-(N)

include, without limitation, laptops, desktops, servers, cellular phones, personal digital assistants (PDAs), multimedia players, embedded systems, combinations of one or more of the same, exemplary computing system 710 in FIG. 7, or any other suitable computing device. In one example, client devices 202(1)-(N) may represent computing devices within a user community (e.g., user community 210), such as an enterprise or the user base of a security-software vendor.

Server 206 generally represents any type or form of computing subsystem (such as a reputation service) capable of generating and providing information that identifies a file's reputation or prevalence. As will be explained in greater detail below, in some examples server 206 may generate such information by collecting, aggregating, and analyzing data from potentially millions of user devices within a community (such as, e.g., an enterprise or the user base of a security-software vendor).

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between client devices 202(1)-(N) and server 206.

Figure 3:
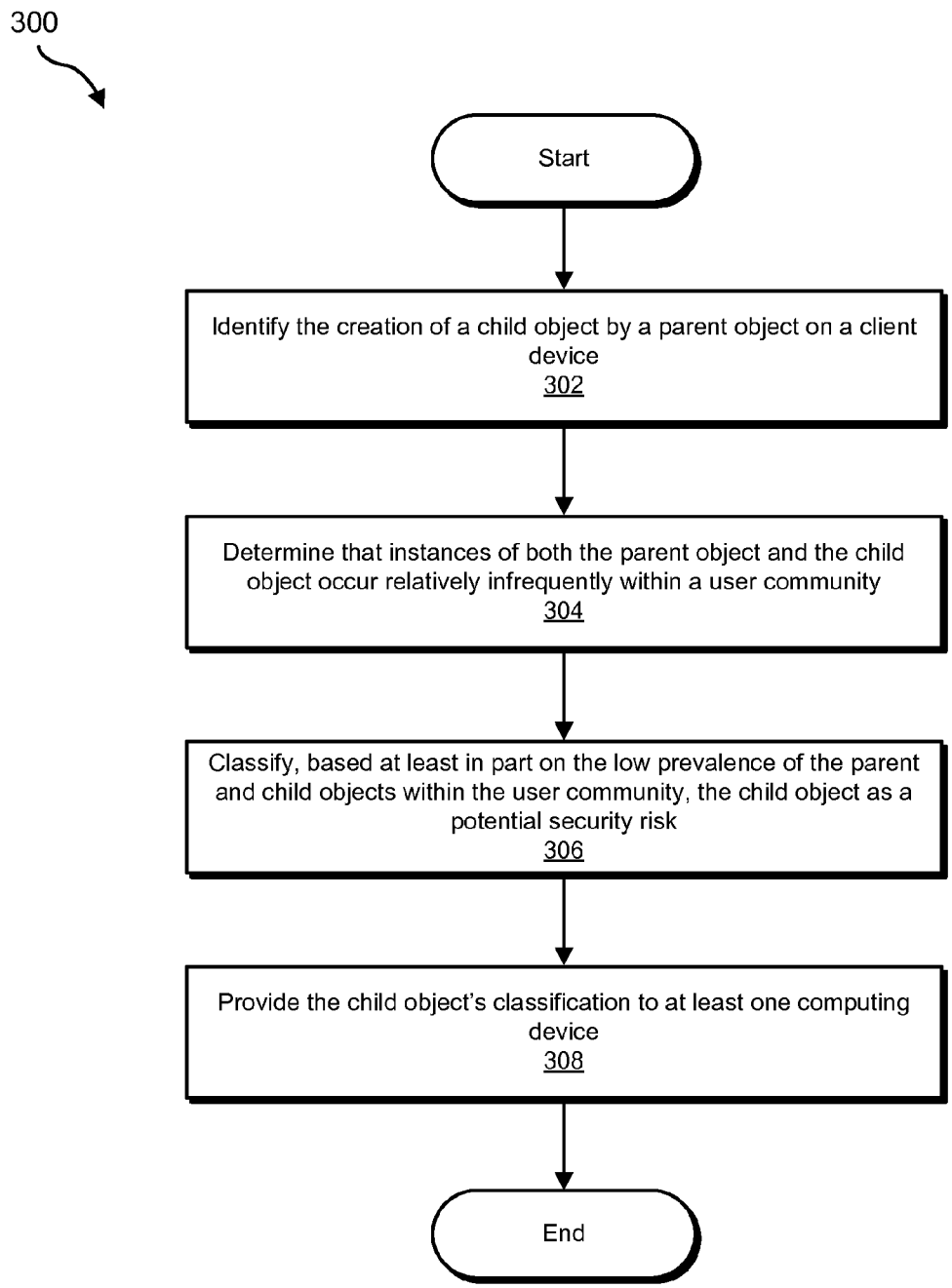
FIG. 3 is a flow diagram of an exemplary server-side method for identifying unique malware variants.

FIG. 3 is a flow diagram of an exemplary computer-implemented, server-side method 300 for identifying unique malware variants. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 the various systems described herein may identify the creation of a child object by a parent object on a client device. For example, identification module 104 may, as part of server 206 in FIG. 2, receive a report from client device 202(1) that identifies the creation of a child object by a parent object on client device 202(1). The term "object," as used herein, may refer to any computer-readable instruction or data structure capable of delivering a malicious payload. In one example, this object may represent a file, such as an executable or DLL.

Figure 4:
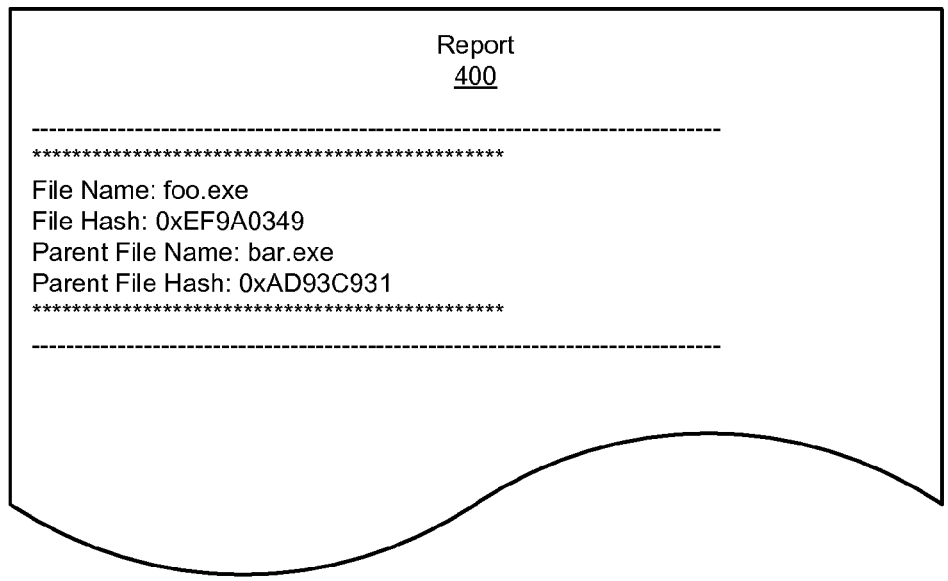
FIG. 4 is an illustration of an exemplary report generated by a client device upon observing or detecting the creation of a child object by a parent object.

The systems described herein perform step 302 in a variety of ways. In one example, identification module 104 may receive a report from a client device that identifies the creation of the child object by its parent object. For example, server 206 in FIG. 2 may receive report 400 in FIG. 4 from client device 202(1). As illustrated in FIG. 4, report 400 may uniquely identify (by, e.g., file name or file hash) a child object ("foo.exe") created by a parent object ("bar.exe") on client device 202(1). In some embodiments, and as will be described in greater detail below in connection with FIG. 6, client device 202(1) may create and send report 400 to server 206 immediately upon observing or detecting the creation of the child object by the parent object. In other examples, client device 202(1) may locally log the creation of such child objects and then report the same to server 206 on a periodic basis.

Returning to FIG. 3, at step 304 the systems described herein may determine that instances of both the parent and child objects identified in step 302 occur infrequently (or have never occurred) within a user community. For example, classification module 106 in FIG. 1 may, as part of server 206 in FIG. 2, determine that an extremely limited number of user devices within user community 210 (which may, as detailed above, consist of hundreds of thousands or potentially millions of users within an enterprise or user base) have previously encountered instances of both the parent object and child object in question.

The various systems described herein may perform step 304 in a variety of ways. In one example, classification module 106 in FIG. 1 may determine the prevalence of the parent and child objects in question within user community 210 by obtaining and analyzing reputation information (such as reputation information 512 and 514 in FIG. 5) for the parent and child objects in question. In some examples, classification module 106 may obtain this reputation information from a local database, such as database 120 in FIG. 2. In other examples, classification module 106 may obtain this reputation information from separate reputation service.

The term "reputation information," as used herein, generally refers to information that identifies a file's reputation or prevalence within a community (such as the user base of a security-software vendor). Examples of reputation information include, without limitation, reputation scores (where, for example, high reputation scores indicate that a file is generally trusted within a community and low reputation scores indicate that a file is generally untrusted within a community), prevalence information (e.g., information that identifies the number or percentage of user devices within a community that have encountered an instance of the file), or any other information that may be used to identify a community's opinion on the trustworthiness or legitimacy of a file, such as the file's location or origin, age, etc.

As indicated above, reputation services may generate reputation information for files by collecting, aggregating, and analyzing data from user devices within a community. Examples of data gathered from user devices within a community that may be used to generate reputation information include, without limitation, information that identifies the overall health of a user device (i.e., information that identifies the performance, stability, and/or state of security of the user device), information that identifies the files stored on or encountered by a user device, information that identifies the impact of a file on the health of the user device (e.g., information that identifies the health of a user device both before and after a file is encountered by the user device), and any other information that may be used to evaluate the trustworthiness of a file. In some examples, by collecting, aggregating, and analyzing this data from potentially millions of user devices within a community (such as the user base of a security-software vendor), reputation services may be able to gain a fairly accurate understanding as to the trustworthiness of a file.

In the example illustrated in FIG. 5, reputation information 512 and 514 may contain information that identifies both a reputation score (i.e., trustworthiness classification) and prevalence information for the parent object "bar.exe" (N/A and 3 users, respectively) and the child object "foo.exe" (N/A and 1 user, respectively). In this example, reputation information 512 may indicate that only three user devices within user community 210 (which may, as detailed above, consist of hundreds of thousands or potentially millions of users within an enterprise or user base) have previously encountered an instance of the parent object "bar.exe." Similarly, reputation information 514 may indicate that an instance of the child object "foo.exe" has never been encountered before within user community 210 (i.e., the child object "foo.exe" represents a singleton).

In the above example, classification module 106 may determine, by obtaining and analyzing reputation information 512 and 514, that instances of both the child object "foo.exe" and its parent ("bar.exe") occur relatively infrequently (or have never occurred) within user community 210. Control of method 300 may then proceed to step 306.

Although not illustrated in FIG. 3, in some examples the systems described herein may, upon completion of step 304, determine that the child object in question satisfies at least one set of pre-filtering criteria prior to proceeding to step 306 in an attempt to avoid false positives (i.e., an incorrect classification of a legitimate file as malicious). Examples of such pre-filtering criteria including, without limitation, criteria for determining that the child object was not digitally signed by trusted signing authority, criteria for determining that the child object did not originate from a trusted source (such as a trusted website), criteria for determining that the child object is not identified within a whitelist of trusted objects, or the like. In one example, by ensuring that the child object satisfies such pre-filtering criteria, the systems described herein may reduce the chances of incorrectly classifying legitimate child objects as potential security risks.

Returning to FIG. 3, at step 306 the systems described herein may classify the child object as a potential security risk based at least in part on the fact that instances of both the child object and its parent object occur relatively infrequently (or have never before occurred) within the user community. For example, classification module 106 in FIG. 1 may, as part of server 206 in FIG. 2, classify the file "foo.exe" identified in report 400 in FIG. 4 as a potential security risk since, as detailed above in connection with step 304, instances of both this file and its parent file ("bar.exe") occur relatively infrequently (or have never before occurred) within user community 210.

The systems described herein may perform step 306 in a variety of ways. In some examples, classification module 106 may only convict a child object (i.e., classify the child object as a security risk) if an instance of the child object and/or its parent object has never been encountered before within the user community (i.e., the child object and/or the parent object represents a new file or singleton). In other examples, classification module 106 may convict a child object if less than a predetermined number of instances of the child object and/or its parent object appear within the user community or if instances of the child object and/or its parent object appear on less than a predetermined percentage of user devices within the user community. These predetermined percentages and numbers may be determined based on a variety of predictive rules and heuristics.

Because legitimate singleton files do not typically originate from other singletons (i.e., legitimate singleton files do not typically spawn additional legitimate singletons), classification module 106 may classify a child object as a potential security risk if instances of both the child object and a parent object responsible for creating the child object have only occurred infrequently, or have not occurred before, within the user community. In contrast, because legitimate singleton files may occasionally originate from non-singleton parents (e.g., video game companies may generate unique DRM keys for each customer and .NET files may be distributed as singletons), classification module 106 may refrain from classifying a singleton file as a potential security risk if instances of a parent file responsible for creating the singleton file have at least occurred before (or have occurred relatively frequently) within the user community.

Returning to FIG. 3, at step 308 the systems described herein may provide the classification assigned to the child object in step 306 to at least one computing device in order to enable the computing device to evaluate the trustworthiness of the child object. For example, classification module 106 in FIG. 1 may, as part of server 206 in FIG. 2, provide the classification assigned to the child object in step 306 to client device 202(N) in order to enable this client device to evaluate the trustworthiness of the child object in question.

The systems described herein may perform step 308 in a variety of ways. In one example, classification module 106 may provide the child object's classification to the client device that originally provided the report that identified the creation of the child object in question (e.g., client device 202(1)). In other examples, classification module 106 may provide the child object's classification to at least one additional client device, such as client devices 202(2)-(N). In either example, the client device may then use this classification in evaluating the trustworthiness of the child object in question, as will be described in greater detail below in connection with FIG. 6. Upon completion of step 308, exemplary method 300 in FIG. 3 may terminate.

Figure 6:
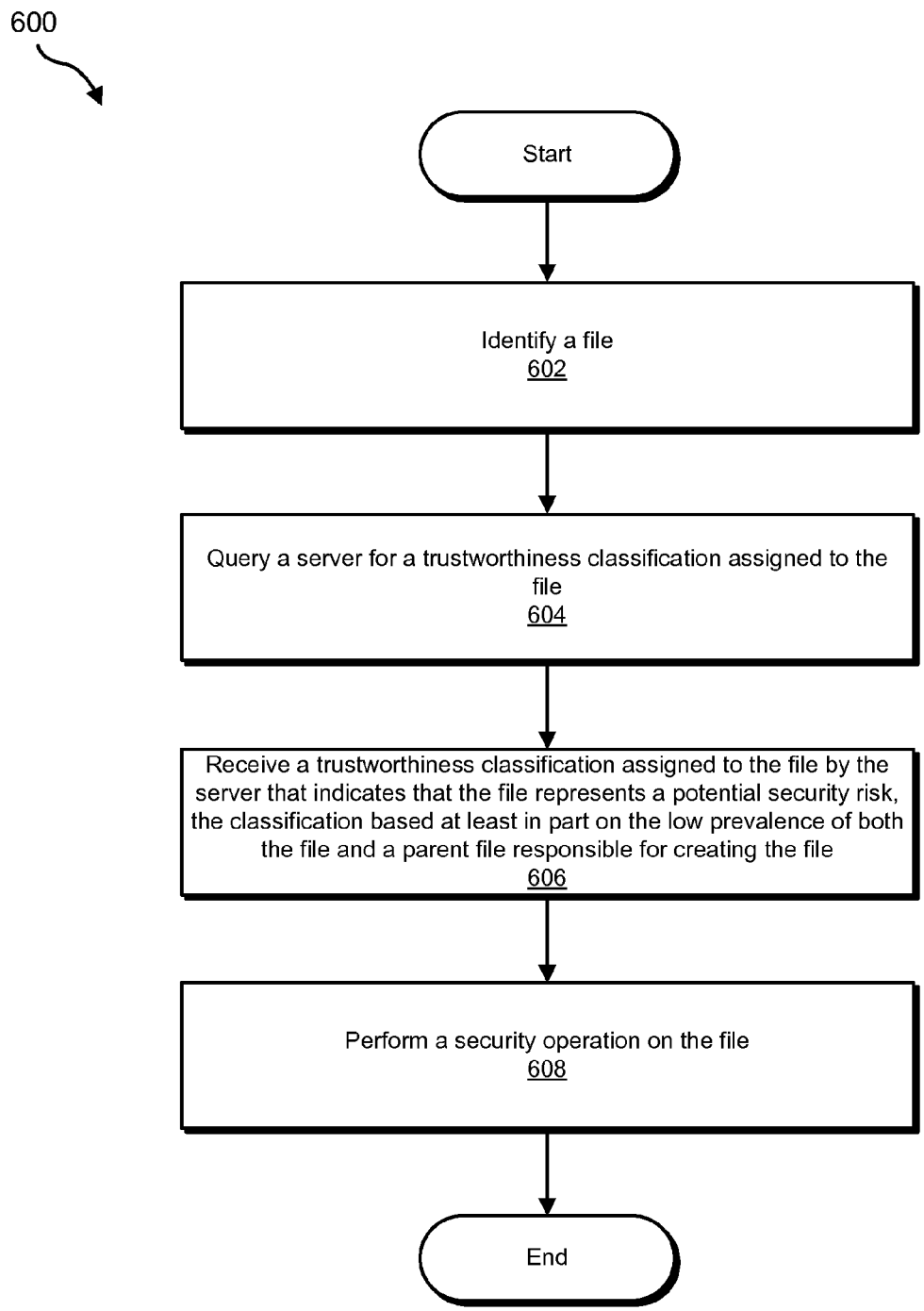
FIG. 6 is a flow diagram of an exemplary client-side method for identifying unique malware variants.

As detailed above, a client device may evaluate the trustworthiness of a file based at least in part on a trustworthiness classification assigned to the file by the process outlined in exemplary method 300 in FIG. 3. FIG. 6 is a flow diagram of an exemplary client-side, computer-implemented method 600 for evaluating the trustworthiness of a file based on such a classification. The steps shown in FIG. 6 may be performed by any suitable computer-executable code and/or computing system. In some embodiments, the steps shown in FIG. 6 may be performed by one or more of the components of system 100 in FIG. 1, system 200 in FIG. 2, computing system 710 in FIG. 7, and/or portions of exemplary network architecture 800 in FIG. 8.

As illustrated in FIG. 6, at step 602 the systems described herein may identify a file. For example, security module 108 in FIG. 1 may, as part of client device 202(N) in FIG. 2, identify a file encountered by client device 202(N).

The systems described herein may identify a file in a variety of ways. In one example, security module 108 may identify a file upon observing or detecting creation of the file by its parent file. For example, security module 108 may observe creation of the file "foo.exe" by its parent file "bar.exe." In other examples, security module 108 may simply identify a file upon encountering the same, regardless of whether security module 108 observed creation of the file in question.

At step 604, the systems described herein may query a server or backend (e.g., a reputation service) for a trustworthiness classification assigned to the file identified in step 602. For example, security module 108 in FIG. 1 may, as part of client device 202(N) in FIG. 2, query server 206 for a trustworthiness classification assigned to the file identified in step 602.

In some examples, security module 108 may include a report within this query that identifies the creation of the file in question by its parent file. As detailed above, this report may include information that uniquely identifies (using, e.g., filenames and/or file hashes) the file in question and/or a parent file responsible for creating the file in question.

Returning to FIG. 6, at step 606 the systems described herein may receive a trustworthiness classification assigned to the file by the server that indicates that the file in question represents a potential security risk. For example, security module 108 in FIG. 1 may, as part of client device 202(N) in FIG. 2, receive a trustworthiness classification assigned to the file "foo.exe" from server 206 that indicates that this file represents a potential security risk.

As detailed above, this trustworthiness classification may be based at least in part on the fact that instances of both the file and a parent file responsible for creating the file occur relatively infrequently within a user community managed by the server. For example, server 206 may (as explained in greater detail above in connection with FIG. 3), upon receiving the query from client device 202(N) in step 604, determine that instances of both the file and a parent file responsible for creating the file occur relatively infrequently (or have never occurred) within user community 210 (which may, as detailed above, consist of hundreds of thousands or potentially millions of users within an enterprise or user base).

Returning to FIG. 6, at step 608 the systems described herein may perform a security operation on the file identified in step 602. For example, security module 108 in FIG. 1 may, as part of client device 202(N) FIG. 2, perform a security operation on the file in question upon receiving a trustworthiness classification from server 206 that indicates that the file represents a potential security risk.

Examples of security operations that security module 108 may perform on the file include, without limitation, quarantining the file, removing the file, preventing the file from executing, flagging the file for further evaluation, or any other operation that may be used to analyze or reduce the potential security risk posed by the file. Upon completion of step 608, exemplary method 600 in FIG. 6 may terminate.

As detailed above, because legitimate singleton files do not typically originate from other singletons (i.e., legitimate singleton files do not typically spawn additional legitimate singletons), the various systems and methods described herein may effectively identify unique instances of packed or otherwise obfuscated malware by determining that instances of a parent file responsible for creating a singleton (or low prevalence) file have been encountered infrequently (or have never been encountered) within an enterprise or user base. As such, these systems and methods may effectively address an existing flaw in conventional security software without unduly increasing false-positive rates.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the gerund phrases from claims steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 (e.g., modules 104-106) from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as gerund phrases from claims.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the gerund phrases from claims steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the gerund phrases from claims steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the gerund phrases from claims steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the gerund phrases from claims steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
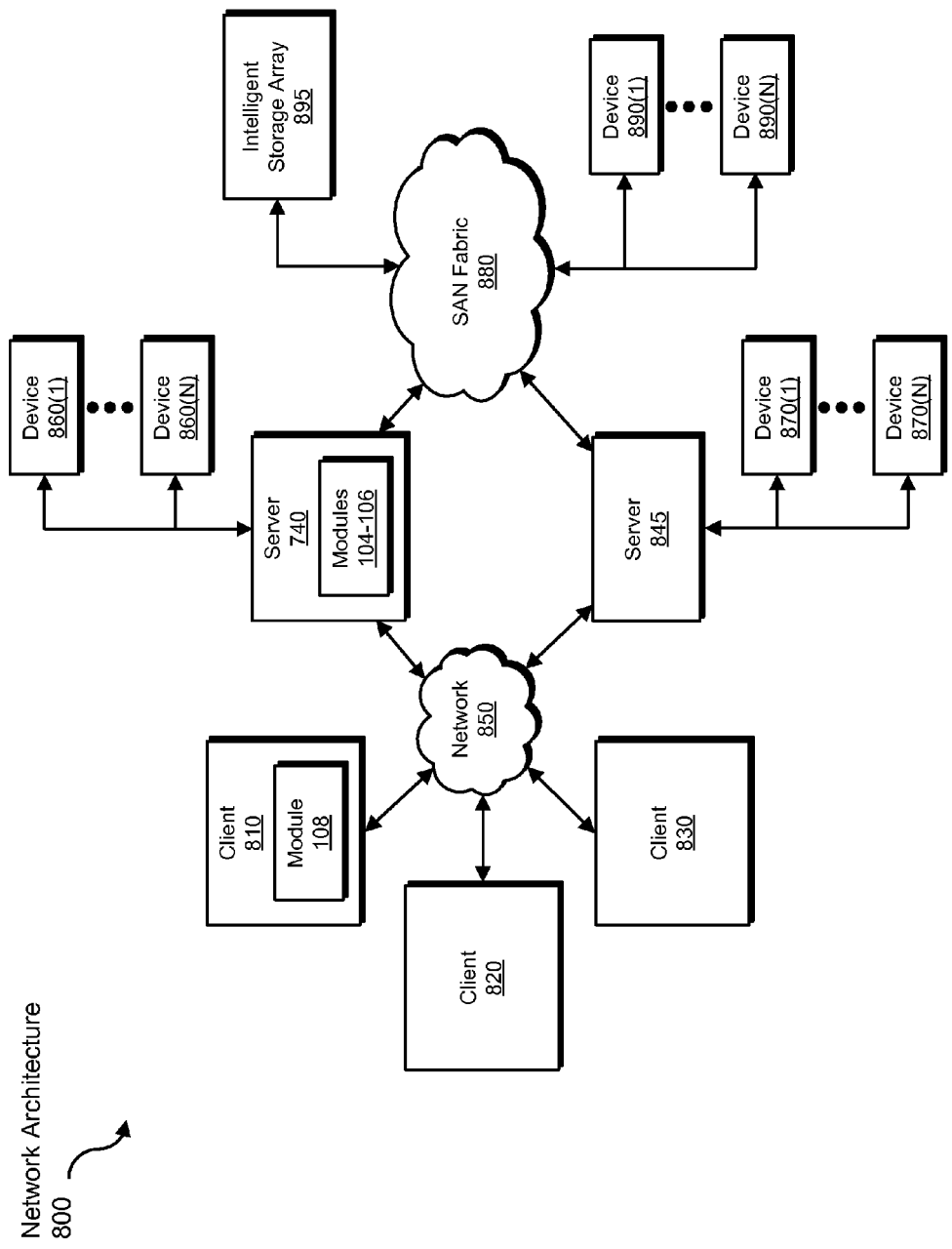
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the gerund phrases from claims steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary server-side method for identifying unique malware variants. In one example, this server-side method may include (1) identifying the creation of a child object by a parent object on a client device, (2) determining that instances of both the parent object and the child object occur relatively infrequently within a user community, (3) classifying, based at least in part on the low prevalence of the parent and child objects within the user community, the child object as a potential security risk, and then (4) providing the child object's classification to at least one computing device in order to enable the computing device to evaluate the trustworthiness of the child object.

In some examples, identifying the creation of the child object by the parent object may include receiving a report from the client device that identifies the creation of the child object by the parent object. In addition, determining that instances of both the parent object and the child object occur relatively infrequently within the user community may include determining that the child object and/or the parent object represents a singleton within the user community.

In one example, the method may also include, prior to classifying the child object as a potential security risk, determining that the child object satisfies at least one set of pre-filtering criteria. Examples of such pre-filtering criteria include, without limitation, criteria for determining that the child object was not digitally signed by a trusted signing authority, criteria for determining that the child object did not originate from a trusted source, and/or criteria for determining that the child object is not identified within a whitelist of trusted objects.

In some embodiments, providing the child object's classification to at least one computing device may include providing the child object's classification to the client device and/or to at least one additional client device. In at least one example, the child object may be a file.

Computing system 710 and/or one or more components of network architecture 800 may perform and/or be a means for performing, either alone or in combination with other elements, one or more steps of an exemplary client-side method for identifying unique malware variants. In one example, this client-side method may include (1) identifying a file, (2) querying a server for a trustworthiness classification assigned to the file, (3) receiving, from the server, a trustworthiness classification assigned to the file that indicates that the file represents a potential security risk, wherein the trustworthiness classification assigned to the file by the server is based at least in part on the fact that instances of both the file and a parent file responsible for creating the file occur relatively infrequently within a user community, and then (4) performing a security operation on the file.

In some embodiments, identifying the file may include detecting creation of the file by the parent file. In addition, querying the server for a trustworthiness classification assigned to the file may include providing a report to the server that identifies the creation of the file by the parent file.

In one example, performing the security operation include quarantining the file, removing the file, preventing the file from executing, and/or flagging the file for further evaluation. In addition, the trustworthiness classification assigned to the file by the server may be based at least in part on the fact that the file and/or the parent file represents a singleton within the user community.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of modules 102 in FIG. 1 may transform a device (such as server 206 in FIG. 2) into a device capable of convicting a child object as a potential security risk upon determining that instances of both the child object and a parent object responsible for creating the child object occur relatively infrequently within a user community managed by the server.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for identifying unique malware variants, at least a portion of the method being performed by a server-side computing device comprising at least one processor, the method comprising:
   identifying the creation of a child object by a parent object on a client device;
   determining that instances of both the parent object and the child object occur relatively infrequently within a user community;
   classifying, based at least in part on the low prevalence of the parent and child objects within the user community, the child object as a potential security risk;
   providing the child object's classification to at least one computing device in order to enable the computing device to evaluate the trustworthiness of the child object.

2. The method of claim 1, wherein identifying the creation of the child object by the parent object comprises receiving a report from the client device that identifies the creation of the child object by the parent object.

3. The method of claim 1, wherein determining that instances of both the parent object and the child object occur relatively infrequently within the user community comprises at least one of:
   determining that the child object represents a singleton within the user community;
   determining that the parent object represents a singleton within the user community.

4. The method of claim 1, further comprising, prior to classifying the child object as a potential security risk, determining that the child object satisfies at least one set of pre-filtering criteria.

5. The method of claim 4, wherein the set of pre-filtering criteria comprise at least one of:
   criteria for determining that the child object was not digitally signed by a trusted signing authority;
   criteria for determining that the child object did not originate from a trusted source;
   criteria for determining that the child object is not identified within a whitelist of trusted objects.

6. The method of claim 1, wherein providing the child object's classification to at least one computing device comprises at least one of:
   providing the child object's classification to the client device;
   providing the child object's classification to at least one additional client device.

7. The method of claim 1, wherein the child object comprises a file.

8. A computer-implemented method for identifying unique malware variants, at least a portion of the method being performed by a client-side computing device comprising at least one processor, the method comprising:
   identifying a file;
   querying a server for a trustworthiness classification assigned to the file;
   receiving, from the server, a trustworthiness classification assigned to the file that indicates that the file represents a potential security risk, wherein the trustworthiness classification assigned to the file by the server is based at least in part on the fact that instances of both the file and a parent file responsible for creating the file occur relatively infrequently within a user community;
   performing a security operation on the file.

9. The method of claim 8, wherein identifying the file comprises detecting creation of the file by the parent file.

10. The method of claim 8, wherein querying the server for a trustworthiness classification assigned to the file comprises providing a report to the server that identifies the creation of the file by the parent file.

11. The method of claim 8, wherein performing the security operation comprises at least one of:
   quarantining the file;
   removing the file;

preventing the file from executing;

flagging the file for further evaluation.

12. The method of claim 8, wherein the trustworthiness classification assigned to the file by the server is based at least in part on the fact that the file represents a singleton within the user community.

13. The method of claim 8, wherein the trustworthiness classification assigned to the file by the server is based at least in part on the fact that the parent file represents a singleton within the user community.

14. A system for identifying unique malware variants, the system comprising:

an identification module programmed to identify the creation of a child object by a parent object on a client device;

a classification module programmed to:

determine that instances of both the parent object and the child object occur relatively infrequently within a user community;

classify, based at least in part on the low prevalence of the parent and child objects within the user community, the child object as a potential security risk;

provide the child object's classification to at least one computing device;

at least one processor configured to execute the identification module and the classification module.

15. The system of claim 14, wherein the identification module identifies the creation of the child object by the parent object by receiving a report from the client device that identifies the creation of the child object by the parent object.

16. The system of claim 14, wherein the classification module determines that instances of both the parent object and the child object occur relatively infrequently within the user community by at least one of:

determining that the child object represents a singleton within the user community;

determining that the parent object represents a singleton within the user community.

17. The system of claim 14, wherein the classification module is further programmed to determine, prior to classifying the child object as a potential security risk, that the child object satisfies at least one set of pre-filtering criteria.

18. The system of claim 17, wherein the set of pre-filtering criteria comprise at least one of:

criteria for determining that the child object was not digitally signed by a trusted signing authority;

criteria for determining that the child object did not originate from a trusted source;

criteria for determining that the child object is not identified within a whitelist of trusted objects.

19. The system of claim 14, wherein the classification module provides the child object's classification to at least one computing device by at least one of:

providing the child object's classification to the client device;

providing the child object's classification to at least one additional client device.

20. The system of claim 14, wherein the child object comprises a file.

* * * * *